United States Patent
Matsumoto

(10) Patent No.: US 9,154,706 B2
(45) Date of Patent: *Oct. 6, 2015

(54) IMAGING APPARATUS AND METHOD FOR CONTROLLING THE SAME

(71) Applicant: CANON KABUSHIKI KAISHA, Tokyo (JP)

(72) Inventor: Yukihiro Matsumoto, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,145

(22) Filed: Jun. 20, 2014

(65) Prior Publication Data

US 2015/0015746 A1 Jan. 15, 2015

Related U.S. Application Data

(63) Continuation of application No. 13/454,851, filed on Apr. 24, 2012, now Pat. No. 8,780,234.

(30) Foreign Application Priority Data

Apr. 28, 2011 (JP) ................................ 2011-101317

(51) Int. Cl.
| | |
|---|---|
| H04N 5/232 | (2006.01) |
| H04N 5/235 | (2006.01) |
| H04N 5/262 | (2006.01) |
| H04N 5/907 | (2006.01) |
| H04N 5/77 | (2006.01) |
| H04N 9/804 | (2006.01) |

(52) U.S. Cl.
CPC ........... *H04N 5/23296* (2013.01); *H04N 5/232* (2013.01); *H04N 5/235* (2013.01);
(Continued)

(58) Field of Classification Search
CPC ....... H04N 5/262; H04N 5/222; H04N 5/235; H04N 5/23296; H04N 5/23216; H04N 9/8042; H04N 5/907; H04N 5/772; H04N 5/2625; H04N 5/23293; H04N 5/232

USPC ........... 348/240.99, 221.1, 362–367, 333.03, 348/333.01–333.12

See application file for complete search history.

(56) References Cited

U.S. PATENT DOCUMENTS 8,379,934 B2 * 2/2013 Jasinski et al. ................. 382/107
8,780,234 B2 * 7/2014 Matsumoto .............. 348/240.99

(Continued)

FOREIGN PATENT DOCUMENTS

| CN | 1565119 A | 1/2005 |
|---|---|---|
| CN | 101588452 A | 11/2009 |

(Continued)

*Primary Examiner* — Tuan Ho
*Assistant Examiner* — Marly Camargo
(74) *Attorney, Agent, or Firm* — Canon USA, Inc., IP Division

(57) ABSTRACT

The present invention is directed to an imaging apparatus configured to display a through image in a visible manner when it is assumed that a status of a focus is confirmed even if a multiple live view display suitable for composition adjustment is performed in multiple exposure photography. The imaging apparatus includes a generation unit configured to multiple-synthesize a through image and at least a captured image, and to generate a multiple-composite image, a display control unit configured to perform control to display the multiple-composite image on a display unit while sequentially updating the multiple-composite image, a magnification instruction receiving unit configured to receive an image magnification instruction, and a control unit configured to perform control to display a through image magnified without multiple-synthesizing, on the display unit when receiving the magnification instruction while displaying the multiple-composite image.

18 Claims, 12 Drawing Sheets

(52) U.S. Cl.
CPC ....... *H04N5/23216* (2013.01); *H04N 5/23293* (2013.01); *H04N 5/2625* (2013.01); *H04N 5/772* (2013.01); *H04N 5/907* (2013.01); *H04N 9/8042* (2013.01); *H04N 5/23209* (2013.01)

(56) References Cited

U.S. PATENT DOCUMENTS

| | | | |
|---|---|---|---|
| 8,937,667 B2 * | 1/2015 | Okazaki | 348/211.8 |
| 2004/0012702 A1 * | 1/2004 | Ishige | 348/333.12 |
| 2009/0244318 A1 * | 10/2009 | Makii | 348/229.1 |
| 2009/0268076 A1 * | 10/2009 | Kawamura et al. | 348/333.12 |
| 2009/0284637 A1 * | 11/2009 | Parulski et al. | 348/333.12 |
| 2013/0235224 A1 * | 9/2013 | Park et al. | 348/218.1 |

FOREIGN PATENT DOCUMENTS

| | | |
|---|---|---|
| JP | 2003-125266 A | 4/2003 |
| JP | 2003-179798 A | 6/2003 |
| JP | 2003-244487 A | 8/2003 |
| JP | 2009-175255 A | 8/2009 |

* cited by examiner

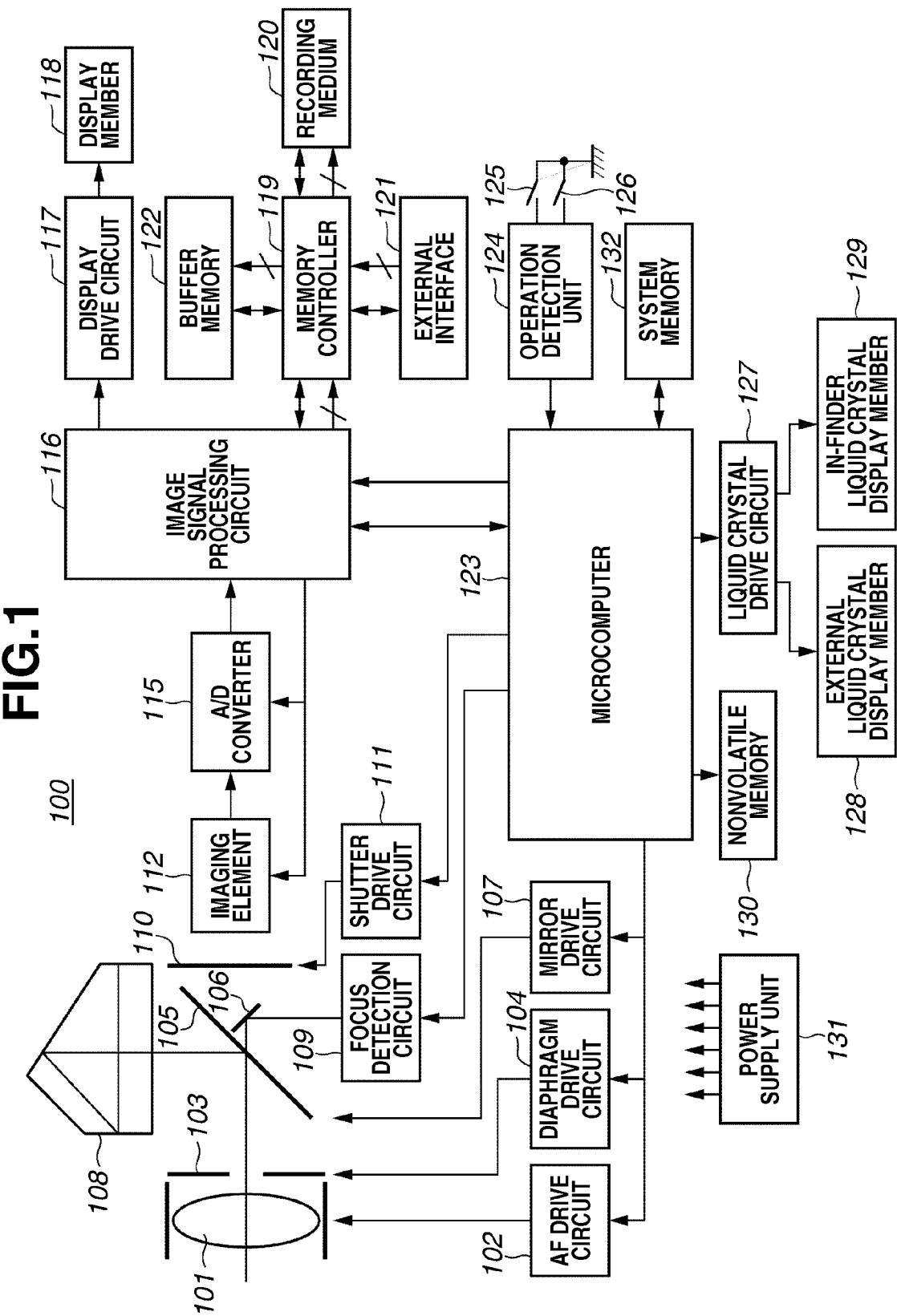

SAME MAGNIFICATION,
DISPLAY TYPE 1

SAME MAGNIFICATION,
DISPLAY TYPE 2

SAME MAGNIFICATION,
DISPLAY TYPE 3

SAME MAGNIFICATION, DISPLAY TYPE 2

FIVE-FOLD MAGNIFICATION, DISPLAY TYPE 3, ONLY THROUGH IMAGE

FIVE-FOLD MAGNIFICATION, DISPLAY TYPE 1

FIVE-FOLD MAGNIFICATION, DISPLAY TYPE 3, MULTIPLE

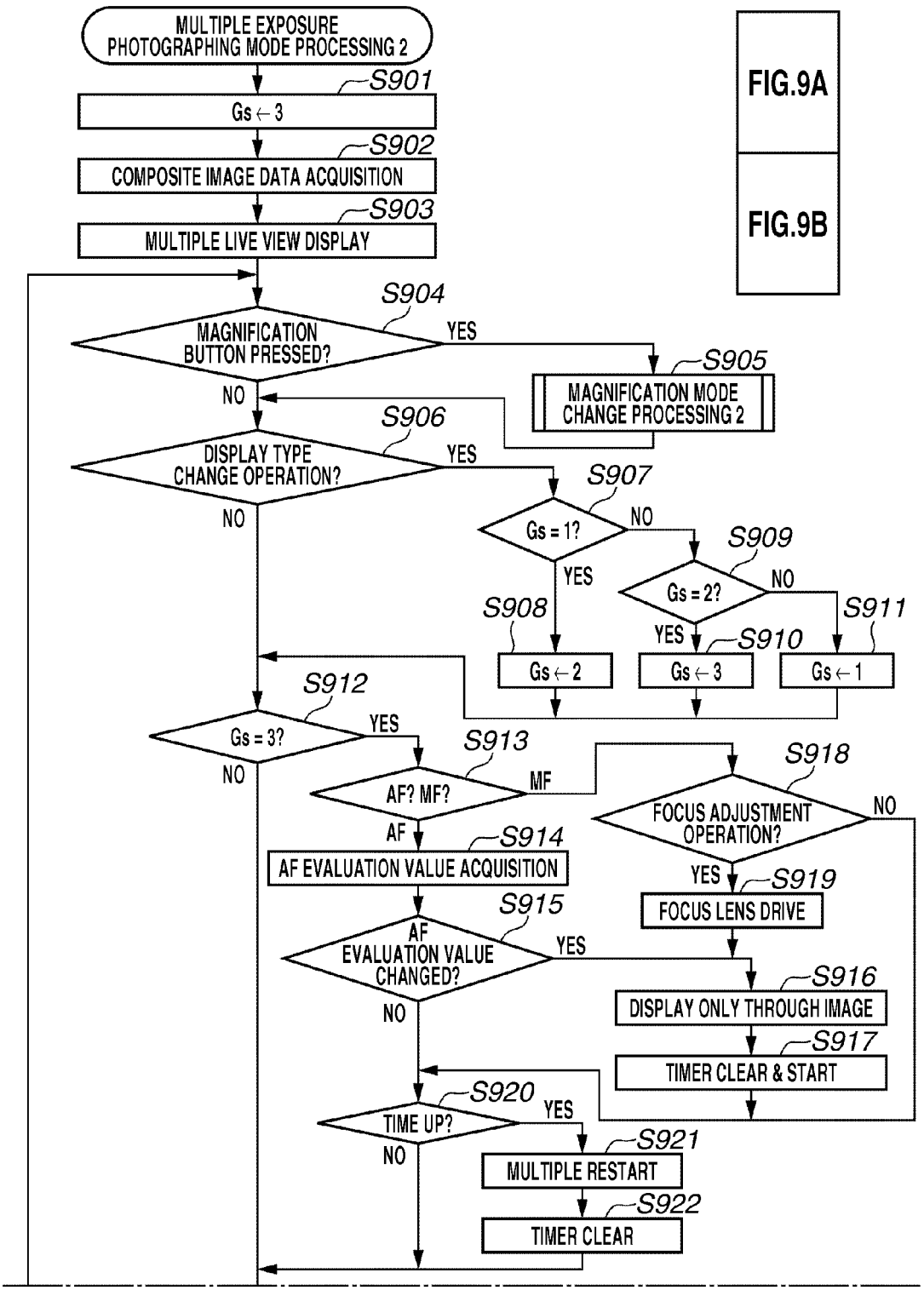

ABSTRACT# IMAGING APPARATUS AND METHOD FOR CONTROLLING THE SAME

This application is a continuation application of U.S. patent application Ser. No. 13/454,851 filed Apr. 24, 2012, which claims priority from Japanese Patent Application No. 2011-101317 filed Apr. 28, 2011, which are hereby incorporated by reference herein in their entirety.

BACKGROUND OF THE INVENTION

1. Field of the Invention

The present invention relates to an imaging apparatus, and particularly relates to an imaging apparatus configured to multiple-synthesize a plurality of captured images.

2. Description of the Related Art

Conventionally, a technique exists, which performs addition processing on a plurality of digital image signals, to carry out multiple exposure photography. Japanese Patent Application Laid-Open No. 2003-125266 discusses a technique that multiplexes and displays a captured image and a through image in a multiple photography mode, to confirm a position where a photographic subject is synthesized, and thereafter the multiple exposure photography can be performed.

On the other hand, Japanese Patent Application Laid-Open No. 2003-179798 discusses a technique that, when a shutter button is half-depressed during a live view display in a photographic standby state, displays an image obtained by imaging a region around a focusing area in a magnified display area with higher resolution, to confirm details. When the image obtained by multiplexing the captured image and the through image is displayed in the multiple photography mode as in Japanese Patent Application Laid-Open No. 2003-125266, the position where the photographic subject is multiple-synthesized is suitably confirmed, which facilitates composition adjustment. However, when a partial range is magnified during live view as in Japanese Patent Application Laid-Open No. 2003-179798, to confirm a status of a focus, the through image cannot be clearly viewed in the multiple display, which makes it difficult to confirm the status of the focus.

SUMMARY OF THE INVENTION

The present invention is directed to an imaging apparatus configured to display a through image in a visible manner when it is assumed that a status of a focus is being confirmed even if a multiple live view display suitable for composition adjustment is performed in multiple exposure photography.

According to an aspect of the present invention, an imaging apparatus includes an imaging unit, a generation unit configured to multiple-synthesize a through image captured by the imaging unit and at least a captured image, and to generate a multiple-composite image, a display control unit configured to perform control to display the multiple-composite image generated by the generation unit on a display unit while sequentially updating the multiple-composite image, a magnification instruction receiving unit configured to receive an image magnification instruction, and a control unit configured to perform control to display a through image magnified without multiple-synthesizing, on the display unit when the magnification instruction receiving unit receives the magnification instruction while displaying the multiple-composite image.

The present invention enables easy viewing of the through image when the status of the focus is confirmed even if the multiple live view display suitable for the composition adjustment is performed in the multiple exposure photography, and can correctly confirm the status of the focus.

This summary of the invention does not necessarily describe all necessary features so that the invention may also be a sub-combination of these described features.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 1 is a configuration block diagram of a digital camera.

DESCRIPTION OF THE EMBODIMENTS

Figure 2A:
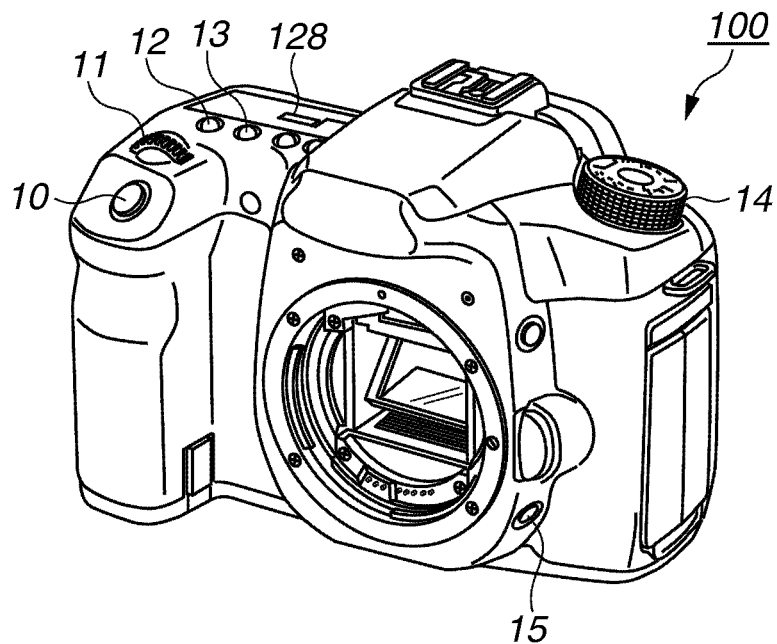
FIGS. 2A and 2B are outline views of the digital camera.

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Various exemplary embodiments, features, and aspects of the invention will be described in detail below with reference to the drawings.

<Configuration Block Diagram>

FIG. 1 illustrates a block diagram illustrating a configuration of a digital camera 100 as a first exemplary embodiment of an imaging apparatus to which the present invention can be applied.

In FIG. 1, a photography lens 101 is an interchangeable lens which includes a zoom lens and a focus lens and is detachable.

An AF (autofocus) drive circuit 102 includes a DC motor and a stepping motor, for example, and changes the position of the focus lens included in the photography lens 101 under control of a microcomputer 123 to focus the camera.

A diaphragm drive circuit 104 drives a diaphragm 103 configured to adjust an amount of light reaching an imaging element 112. The microcomputer 123 calculates a driving amount, to change an optical diaphragm value.

A main mirror 105 is a mirror configured to switch a light flux incident on the photography lens 101 between a finder side and an imaging element 112 side. The main mirror 105 normally reflects the light flux to the finder unit. In the case where photography is performed, or in the case of a live view display, the main mirror 105 makes a leap to lead the light flux to the imaging element 112, and is retreated from the light flux (mirror up). The main mirror 105 is a half mirror having a central portion configured to partially transmit light. The main mirror 105 partially transmits the light flux so that the light flux is incident on a sensor configured to perform focus detection.

A submirror 106 is a mirror configured to guide and reflect the light flux transmitted from the main mirror 105, to a sensor (disposed in a focus detection circuit 109) to perform focus detection.

A mirror drive circuit 107 drives the main mirror 105 under control of the microcomputer 123.

A finder includes a pentaprism 108. The finder further includes a focus board and an eyepiece lens (not illustrated).

The focus detection circuit 109 is a block configured to perform focus detection. The light flux transmitted through the central portion of the main mirror 105 and reflected by the submirror 106 is guided to a sensor disposed in the focus detection circuit 109 to perform photoelectric conversion. A defocus amount used for a focus operation is obtained by calculating the output of the sensor. The microcomputer 123 evaluates an operation result, and instructs the AF drive circuit 102 to drive the focus lens.

A shutter drive circuit 111 drives a focal-plane shutter 110. The microcomputer 123 controls an opening time of a shutter.

A CCD and a CMOS sensor are used for the imaging element 112. The imaging element 112 converts a photographic subject image formed by the photography lens 101 into an electric signal.

An A/D converter 115 converts an analog output signal output from the imaging element 112 into a digital signal.

A video signal processing circuit 116, which is realized by a logic device such as a gate array, performs various video signal processing.

A display drive circuit 117 is a drive circuit configured to make a display member 118 perform a display. The display member 118 is a display such as a TFT liquid crystal display or an organic EL display. The display member 118 is a back monitor of the digital camera 100 in the present exemplary embodiment.

A memory controller 119 stores unprocessed digital image data input from the video signal processing circuit 116 in a buffer memory 122. The memory controller 119 stores the processed digital image data in a recording medium 120. To the contrary, the memory controller 119 outputs the image data to the video signal processing circuit 116, from the buffer memory 122 or the recording medium 120. Furthermore, the memory controller 119 can output the image stored in the recording medium 120 via an external interface 121 connectable to a computer.

The recording medium 120 is a removable recording medium such as a memory card. The recording medium 120 may be a recording medium incorporated in the digital camera. The recording medium 120 may include a plurality of recording media.

The external interface 121 is an interface configured to connect the digital camera 100 to an external device such as a computer by wire communication or wireless communication.

The buffer memory 122 is a memory configured to temporarily hold the image data. The buffer memory 122 stores also various images used in the middle of multiple exposure photography.

The video signal processing circuit 116 subjects the digitized image signal to filter processing, color conversion processing, and gamma processing to generate development data and subjects the development data to compression processing such as JPEG. The video signal processing circuit 116 outputs the compressed data to the memory controller 119.

The video signal processing circuit 116 executes addition of two or more development data on the buffer memory 122, generates high precision data wherein bits of gradation are increased from the development data, or simultaneously executes both processing. The video signal processing circuit 116 can write back the results to the buffer memory 122. Furthermore, the video signal processing circuit 116 can also output the image signal from the imaging element 112, and the image signal conversely input from the memory controller 119, to the display member 118 through the display drive circuit 117. These function switching is performed by instruction of the microcomputer 123.

The video signal processing circuit 116 can output exposure information of a signal of the imaging element 112 and information such as a white balance to the microcomputer 123 if needed. The microcomputer 123 instructs the white balance and gain adjustment based on the information. In the case of a continuous photography (continuous shooting) operation, the microcomputer 123 once stores photography data in the buffer memory 122 with the unprocessed image as it is, and reads the unprocessed image data through the memory controller 119. The video signal processing circuit 116 performs image processing and compression processing on the unprocessed data, and performs continuous photography. The number of continuous photography depends on the capacity of the buffer memory 122.

The microcomputer 123, which is a main control unit configured to control the entire digital camera 100, executes various programs recorded in a nonvolatile memory 130 using a system memory 132 as a work memory.

An operation detection unit 124 detects operation of an operation member. When the operation member is operated, the operation detection unit 124 transmits the state thereof to the microcomputer 123. The microcomputer 123 controls each unit according to a change in the operation member. The operation detection unit 124 can detect also the opened and closed states of a lid 28 (hereinafter, card lid 28) of a slot storing the recording medium 120, and a battery lid 29.

A switch 1 (125) (hereinafter, SW1) is a switch to be turned on by the half-depressing operation of a release button 10 which is one of the operation members. When the switch 1 is turned on, the microcomputer 123 makes a photography preparation such as an autofocus (AF) operation or a photometry operation.

A switch 2 (126) (hereinafter, SW2) is a switch to be turned on by the full-depressing operation of the release button 10 which is one of the operation members. When the SW2 is turned on, the microcomputer 123 captures an image to perform main photography processing for recording the captured image in the recording medium 120 as an image file. The imaging due to the operation of the SW2 is referred to as main photography in order to distinguish the imaging due to the operation of the SW2 from imaging for a through image.

While the SW1 and the SW2 continue to be in an on-state, a continuous photography operation is performed.

A liquid crystal drive circuit 127 drives an external liquid crystal display member 128 and an in-finder liquid crystal display member 129 according to a display content instruction of the microcomputer 123. The external liquid crystal display member 128 and the in-finder liquid crystal display member 129 display an operating state and a message using a character and an image. A backlight such as an LED (not illustrated) is disposed in the in-finder liquid crystal display member 129. The LED is also driven by the liquid crystal drive circuit 127.

After the microcomputer 123 confirms the remaining capacity of the recording medium 120 through the memory controller 119 based on predictive data of ISO sensitivity, the image size, and image quality set before photography, the microcomputer 123 can calculate a photography available residual number. The photographable remaining number can be displayed also on the display member 118, the external liquid crystal display member 128, and the in-finder liquid crystal display member 129 if needed.

The nonvolatile memory 130 includes an EEPROM and a flash memory. The nonvolatile memory 130 can store data even in a state where power is not applied to the camera. A power supply unit 131 supplies power required for each block or a drive system.

<Outline View>

Figure 2B:
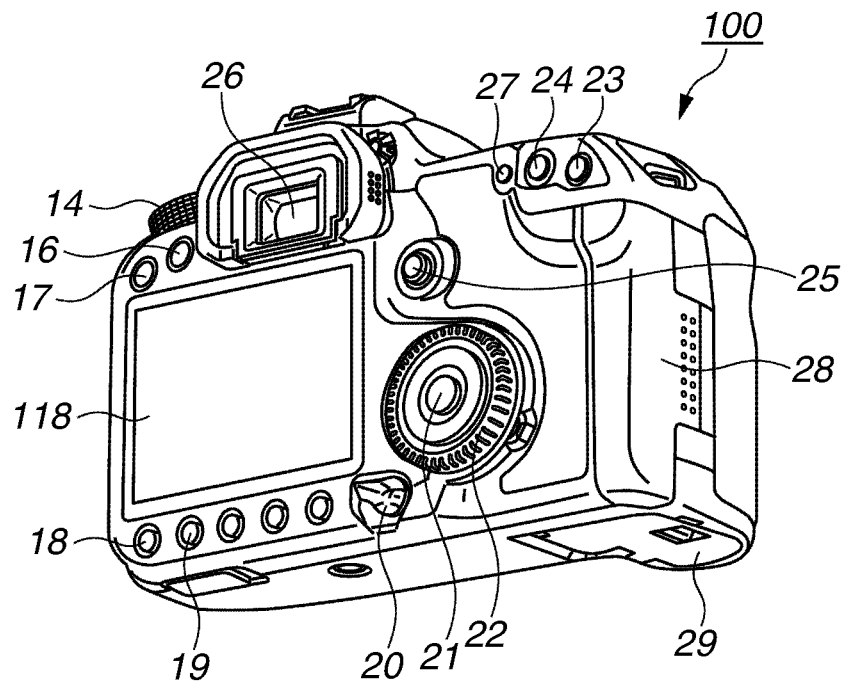

FIG. 2 illustrates outline views of the digital camera 100. FIG. 2A is a front perspective view of the digital camera 100. FIG. 2B is a back perspective view of the digital camera 100. In the front perspective view, the photography lens 101 as the interchangeable lens is removed.

As illustrated in FIG. 2A, the digital camera 100 includes the release button 10, a main electronic dial 11, an ISO setting button 12, an exposure correction button 13, a photography mode dial 14, and a diaphragm button 15 as the operation members. The diaphragm button 15 is a button configured to narrow down the diaphragm 104 to a set diaphragm (F value). Lightness of a captured image in the set diaphragm can be confirmed by depressing the diaphragm button 15 during the live view display in a photography mode.

The live view display is a display continuously displaying an image (through image) captured by the imaging element 112, on the display member 118 approximately in real time in a state where the main mirror 105 is retreated, in which the display member 118 functions as an electronic view finder. In the live view display, the A/D converter 115 converts the image formed on the imaging element 112 into the digital signal. The video signal processing circuit 116 performs development to generate the through image. The through image, or a multiple-composite image obtained by synthesizing the through image and the captured image is displayed on the display member 118. The displayed image is sequentially updated, and is viewed as a moving image. For example, the live view display of 30 fps is enabled by repeating the processing 30 times per one second.

The main electronic dial 11, which is a rotating operation member, is used for an operation for changing an item selected when increasing or decreasing various setting values such as a photography condition. Further, the main electronic dial 11 is used for changing items when selecting various items, and for switching an image by a group in a replay mode.

As illustrated in FIG. 2B, the digital camera 100 includes an information display button 16, a menu button 17, a replay button 18, an erasure button 19, a main Sw 20, and a setting button 21 as the operation members. The digital camera 100 further includes a sub electronic dial 22, a magnification button 23, a reduction button 24, and a multicontroller 25. The main Sw 20 is an operation member configured to switch ON/OFF of the power supply of the digital camera 100. The sub electronic dial 22, which is a rotating operation member, is used for an operation for changing an item selected when selecting various items, and an image feeding operation for switching an image displayed in the replay mode. A finder eyepiece unit 26 is an eyepiece unit when a user looks into the finder to view an optical image. A live view button 27 is a button configured to receive an instruction for starting the live view display. The live view button 27 is depressed to switch ON/OFF of the live view display. The card lid 28 is a lid of a storage unit configured to store the recording medium 120. The battery lid 29 is a lid of a storage unit configured to store a battery as the power supply unit 131.

<Preliminary Setting for Multiple Exposure Photography>

A method for setting preliminary setting items for multiple exposure photography will be described.

Figure 3A:
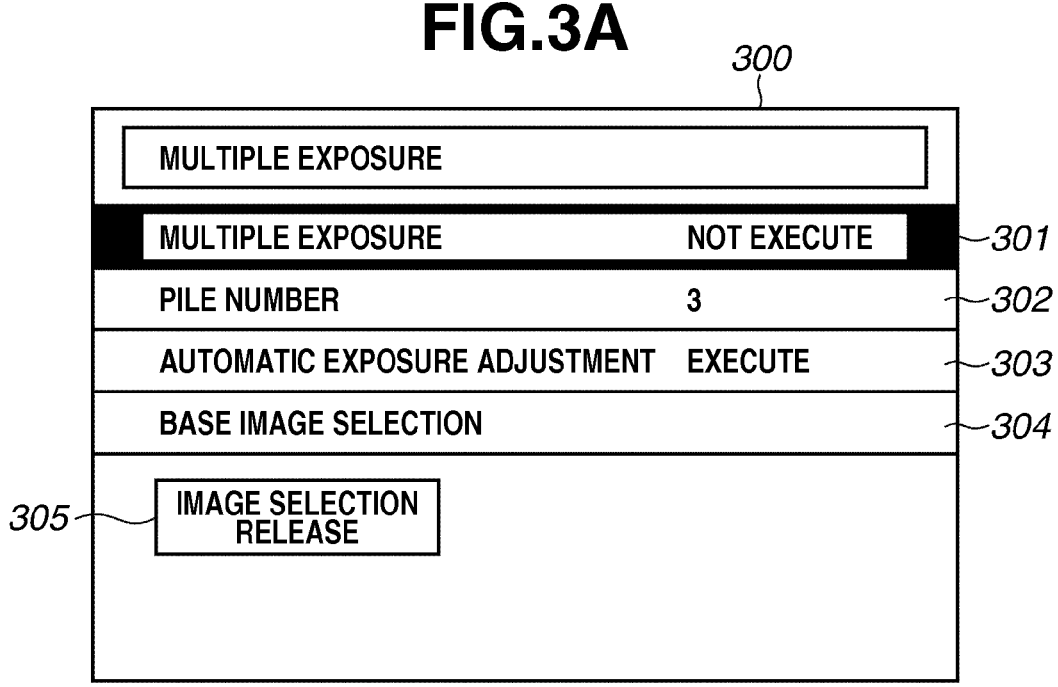
FIGS. 3A and 3B are display examples of a menu screen for a preliminary setting in multiple exposure photography.

FIG. 3 illustrates display examples of a menu screen for setting the digital camera 100 for multiple exposure photography. A menu screen 300 for the multiple exposure photography of FIG. 3A is displayed on the display member 118 by depressing the menu button 17 to display an entire menu, and selecting and determining a menu for the multiple exposure photography from the entire menu, Menu items 301 to 304 are displayed on the menu screen 300. The user can operate the sub electronic dial 22 to select an optional menu item from the menu items 301 to 304. A setting candidate list for the selected menu item is displayed by depressing the setting button 21 in a state where any one of the menu items is selected. A desired setting candidate is selected from the displayed setting candidate list by the operation of the sub electronic dial 22. The selected setting candidate can be determined and set as the setting value by pressing the setting button 21 again.

The menu item 301 is a menu item selecting whether the multiple exposure photography is performed. Anyone of two setting candidates of "execute" and "not execute" can be selected and set. Hereinafter, the setting of the item is referred to as multiple exposure photography necessity setting. The multiple exposure photography necessity setting is recorded in the system memory 132 or the nonvolatile memory 130. When the multiple exposure photography necessity setting is changed to "execute" from "not execute" according to a user's operation, the multiple exposure photography mode is set, and the multiple exposure photography is started from the next photography (mode setting). The multiple exposure photography necessity setting is automatically changed to "not execute" from "execute" under some conditions to be described later, such as a case where the multiple exposure photography reaches a scheduled number and is ended. When the item is set to "not execute" according to the user's operation even in the middle of the multiple exposure photography, the multiple exposure photography is ended at the time. If a file of the multiple-composite image can be generated in that case, the file of the multiple-composite image is generated based on control of the microcomputer 123.

The menu item 302 is used for selecting the number of images synthesized in one set of multiple exposure photography. The number of some images of the setting candidates of 2 to 9 can be selected and set. When a base image is not selected, the number of the images set in the menu item 302 is a scheduled number of the multiple exposure photography. When the base image is selected, the scheduled number of the multiple exposure photography is a value decreased by 1 from the number of the images set in the menu item 302. The scheduled number of the multiple exposure photography is recorded in the system memory 132. The item cannot be selected and changed in a state (hereinafter, referred to as a state during multiple exposure photography, that is, a state of flag=1 during the multiple exposure photography to be described later) where the multiple exposure photography is not completed after one or more images are captured in the multiple exposure photography.

The menu item 303 is used for selecting execution necessity of an automatic exposure adjusting function in the multiple exposure photography. Any one of two setting candidates of "execute" and "not execute" can be selected and set. The item cannot be selected and changed in the state during multiple exposure photography.

The menu item 304 is used for selecting the base image in multiple exposure photography. One image can be selected from the image (the image recorded before being set to the multiple exposure photography mode) recorded in the recording medium 120, and set to the base image. The item can be set only when the multiple exposure photography necessity is set to "execute", and when multiple exposure photography is not being performed. In other words, the base image can be set in the menu item 304 only before the first photography is performed after the multiple exposure photography necessity is set to "execute".

Figure 3B:
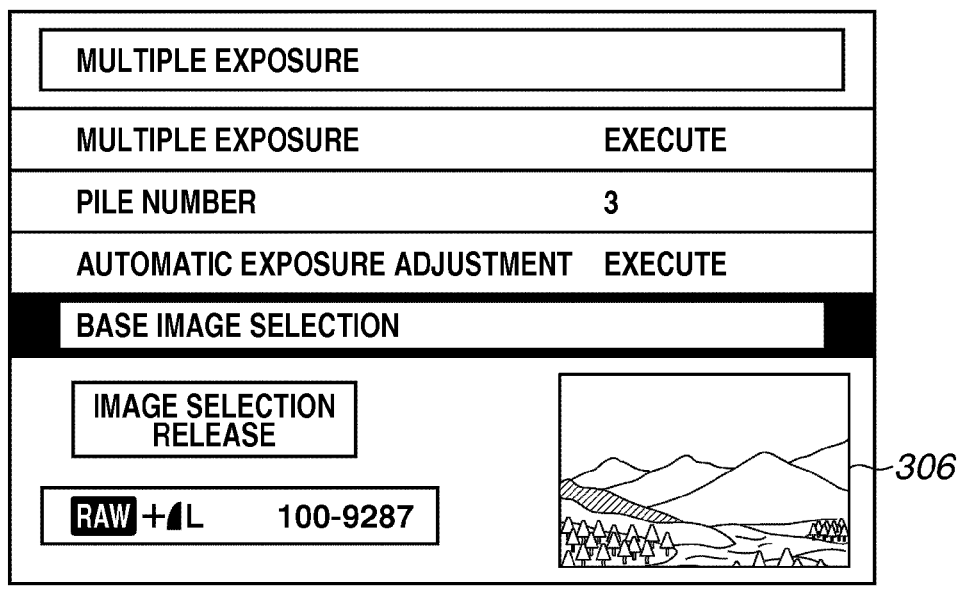

When the base image is set, a screen is displayed as illustrated in FIG. 3B. An image 306 is an image set as the base image among images recorded in the recording medium. When one or more photography are performed in the multiple exposure photography mode or the live view display is started, the base image is read from the recording medium 120 by the video signal processing circuit 116. The base image is arranged in a form converted into the development data on the buffer memory 122. When the base image is selected, the value (an image size of an image captured in the subsequent multiple exposure photography) of the image size is set as the photography condition to the same value as the base image. Thus, when the base image is selected, the multiple exposure photography can be performed with the image captured in the past as the first image.

In the present exemplary embodiment, the image selectable as the base image is only the image captured by the digital camera 100 in the past to match the image size. If an image has the image size which can be set as the photography condition by the digital camera 100, an image other than the image captured by the digital camera 100 may be set to the base image. An image which is different from the image size which can be set as the photography condition by the digital camera 100 may be resized by the video signal processing circuit 116, to be set as the base image. When the multiple exposure photography is ended, the setting of the base image is released, and the base image is in an unselected state. An image selection release button 305 is a button icon for canceling the selected base image. When the selection is decided, the base image is in an unselected state.

<Data Used for Processing>

Next, data used in processing of the multiple exposure photography will be described. When the processing of the multiple exposure photography is executed, the following variables are used.

Multiple Exposure Photography Necessity Setting: "Execute" or "not execute" can be set. A setting value is recorded in the nonvolatile memory 130 or the system memory 132. The state of "execute" refers to the multiple exposure photography mode.

Scheduled Number of Multiple Exposure Photography: The scheduled number of the multiple exposure photography is a value representing the number of times of multiple exposure photography (hereinafter, referred to as one set of multiple exposure photography) performed to generate one multiple image, and is recorded in the system memory 132. When the base image is not set, the scheduled number of the multiple exposure photography is a number set in the menu item 302 of FIG. 3. When the base image is set, the scheduled number of the multiple exposure photography is the set number-1 in the menu item 302 of FIG. 3.

Completed Number of Multiple Exposure Photography: The completion number of the multiple exposure photography is a value representing the number of the photography executed up to now in one set of multiple exposure photography, and is recorded in the system memory 132. When the completion number of the multiple exposure photography=the scheduled number of the multiple exposure photography, one set of multiple exposure photography is ended, and the multiple exposure photography processing are completed.

Magnification Mode Flag: The magnification mode flag is a variable which manages whether magnification is performed in a magnification mode in the live view display, and is recorded in the system memory 132. Magnification mode=same magnification (the full-screen of the entire image), magnification mode=five-fold, and magnification mode=ten-fold are sequentially switched according to the depression of the magnification button 23.

Display type Gs: The display type Gs is a variable representing a selected type of a plurality of information displays. In the present exemplary embodiment, the display types are three kinds 1 to 3. The display type Gs is a number selected from these types.

During multiple exposure photography, information representing a storage area on the recording medium 120, about each original image captured up to current time point in one set of multiple exposure photography is recorded in the system memory 132 as written file information. When a plurality of recording media recording an image exists, information specifying a recording medium as storage destination is also recorded.

<Live View Display During Multiple Exposure Photography Mode>

The display example of the live view display when the above-mentioned multiple exposure photography necessity is set to "execute" and the multiple exposure photography mode is set, will be described. In the multiple exposure photography mode, the through image, the base image (when the base image is set), and the images captured up to the current time point from the start of the multiple exposure photography mode are multiple-synthesized, and the multiple-synthesized image can be displayed as the live view display. A multiple image combination and a multiple image combination result image may refer to an image generated by superimposing, composing, synthesizing, or merging images by way of example and not of limitation. Multiple image combination and multiple image combination result image do not refer to synthesizing a plurality of images that are placed in a tile-arranged configuration such as is done for a panoramic effect. Multiple image combination and multiple image combination result image may be referred to as multiple-synthesize image, multiple-composite image, multiple image combination image, or multiple-composite image.

Figure 4A:
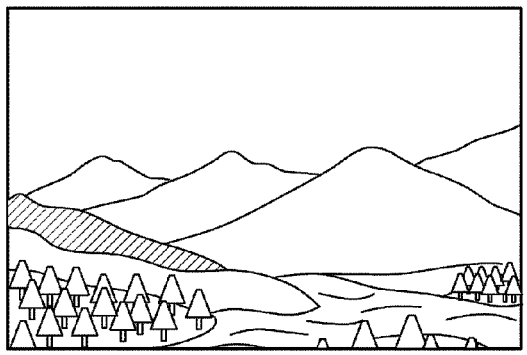
FIGS. 4A to 4C illustrate display examples of a multiple live view display.
Figure 4B:
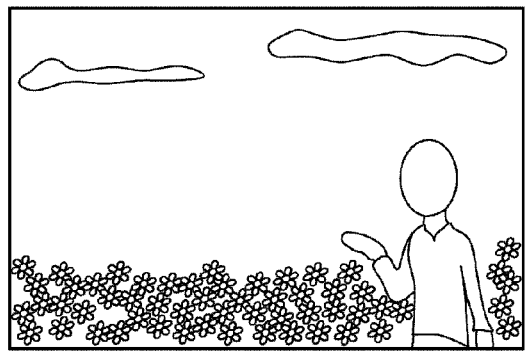
Figure 4C:
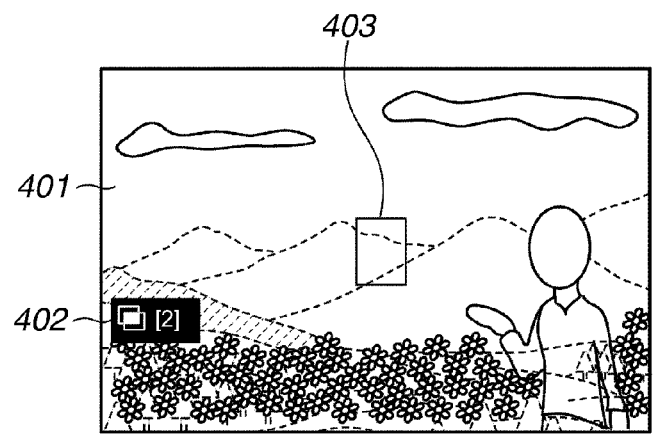

FIG. 4A illustrates an example of an image (hereinafter, referred to as synthesis image data) obtained by multiple-synthesizing the base image (when the base image is set) and the images captured up to the current time point from the start of the multiple exposure photography mode. Because this image is obtained by multiple-synthesizing the captured images, the image is a still image. The example of the through image is illustrated in FIG. 4B. Because the through image is an image sequentially captured by the imaging element 112, the through image is viewed as the moving image. FIG. 4C illustrates a display example of a live view display in a multiple display in the display member 118. An image 401 is an image obtained by multiple-synthesizing the synthesis image data illustrated in FIG. 4A and the through image illustrated in FIG. 4B. The portion of the through image is sequentially updated, and is viewed as the moving image.

An image thus displayed by multiple-synthesizing the synthesis image data and the through image is referred to as a multiple live view display. An icon representing the multiple exposure photography mode is displayed on the left side in a dialog 402. The remaining number (the scheduled number of the multiple exposure photography—the completion number of the multiple exposure photography) up to the finishing number of the multiple exposure photography is displayed on the right side in the dialog 402. In the illustrated example, the remaining number is 2.

An AF frame 403 is a frame illustrating a focus adjustment area focused by AF. In contrast AF, an evaluation value of contrast is acquired from the inside of the AF frame 403, and the contrast AF is performed based on the evaluation value. The user views the multiple live view display as exemplified in FIG. 4C, to confirm a position at which a photographic subject (through image) is multiple-synthesized within the captured synthesis image data, and the composition can be adjusted to be photographed. The video signal processing circuit 116 performs multiple-synthesizing processing for the multiple live view display based on the control of the microcomputer 123.

When the live view display is performed in the multiple exposure photography mode, information display can be performed in any one display type of the plurality of information displays. FIG. 5 illustrates display examples of three display types.

Figure 5A:
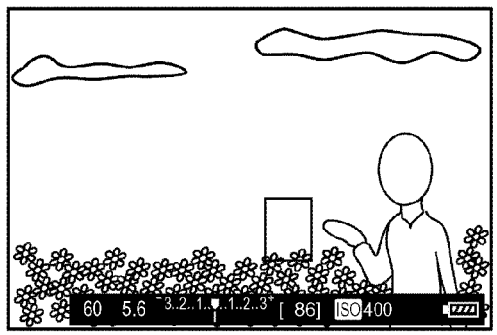
FIGS. 5A to 5C are display examples in same magnification in display types 1 to 3.

FIG. 5A illustrates a display example in a display type 1. FIG. 5A is an example displayed in the display type 1 in the case of same magnification. The same magnification is a display magnification for displaying the entire image in the maximum size which can be fitted in the display area of the display member 118. Even in the multiple exposure photography mode, the multiple display illustrated in FIG. 4 is not performed in the display type 1, and only the through image is displayed as the image. The AF frame, and a shutter speed, a diaphragm value, an exposure correction value, and a remaining photographable number of the recording medium 120 as the present setting values of the digital camera 100 are displayed on the through image.

Figure 5B:
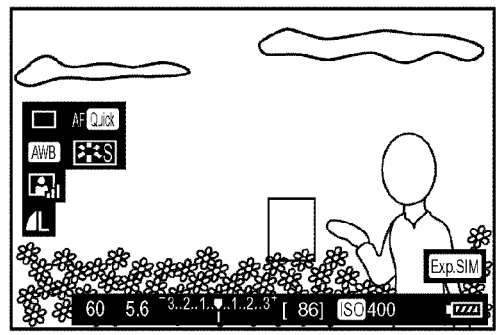

FIG. 5B illustrates a display example in a display type 2. FIG. 5B is an example in the display type 2 when a magnification ratio is set to same magnification. The display type 2 displays only the through image as the image even in the multiple exposure photography mode, as in the display type 1. A photography mode, an AF system, and a size of a photography image as the present setting values of the digital camera 100 are displayed in addition to the information displayed in the display type 1.

Figure 5C:
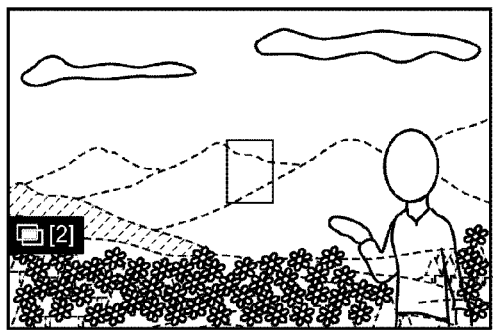

FIG. 5C illustrates a display example in a display type 3. FIG. 5C is a display example in the display type 3 when the magnification ratio is set to same magnification. FIG. 5C is the display of FIG. 4C described above. In the display type 3, the multiple live view display is basically performed as illustrated. However, the multiple live view display may be stopped even in the display type 3 depending on some conditions to be described later, to display only the through image. Because the display type 3 is a multiple exposure photography display type, the information display is minimized so as not to hinder the visual recognition of the multiple live view display. The rest of the information will not be displayed. For example, a shutter speed, a diaphragm value, as the setting values, an exposure correction value, a remaining photographable number in the recording medium 120, an AF system, a size of a photography image, a brightness histogram, and inclination information based on a level gauge are not displayed.

The display type setting can be optionally changed by the toggle operation of the information display button 16. If the selected display type is 1 when information display button 16 is depressed, the display type is changed to 2. If the display type is 2, the display type is changed to 3. If the display type is 3, the display type is changed to 1.

The live view display can be magnified by depressing the magnification button 23 when the live view display is performed in the multiple exposure photography mode. Two kinds of magnification ratio can be used, namely five-fold and ten-fold. There are three kinds of the magnification ratio if same magnification is included. The magnification is sequentially switched according to the depression of the magnification button 23. When the set magnification of the live view display is same magnification, the magnification can be switched to five-fold. When the set magnification of the live view display is five-fold, the magnification can be switched to ten-fold. When the set magnification of the live view display is ten-fold, the magnification can be switched to same magnification.

An initial magnification area when a magnification operation is started according to the depression of the magnification button 23 is the AF frame displayed in the case of the same magnification, or an area around a position specified by the user. Then, when an operation moving the magnification area is received from the user, the magnification area is changed, and an optional area of an imaging area is magnified and displayed. The magnified through image can be viewed, and the user can confirm the degree of adjustment of the present focus in detail.

FIG. 6 illustrates display examples in the display member 118 in each display type when the magnification button 23 is depressed to magnify the image five-fold.

Figure 6B:
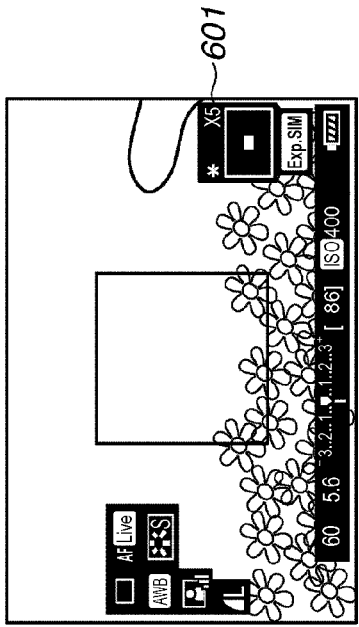
FIGS. 6A to 6D are display examples in the case of five-fold magnification of the display types 1 to 3.
Figure 6D:
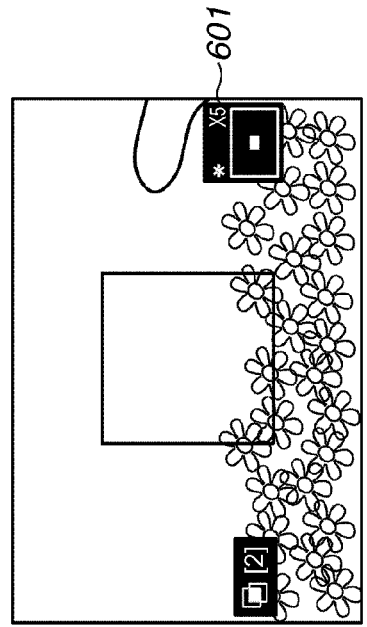
Figure 6A:
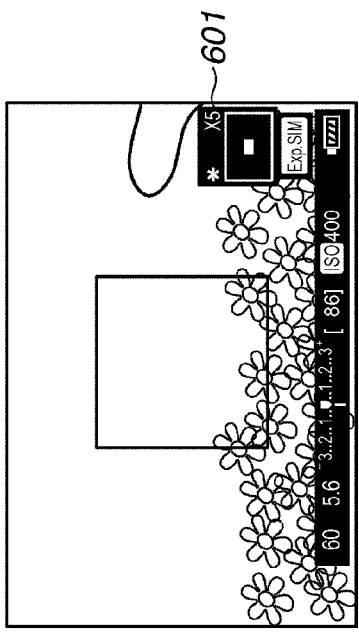

FIG. 6A is a display example in the case of five-fold magnification in the display type 1. A magnification area guide 601 and an information display in the display type 1 are displayed with the through image magnified five-fold. The through image magnified five-fold is an image captured in a pixel density and in an area different from those in the case of same magnification, by the imaging element 112 so that resolution of an area magnified and displayed is sufficiently great (referred to as a through image for five-fold). However, when the through image acquired in the case of the same magnification has sufficient number of pixels which do not deteriorate image quality even if the through image is magnified five-fold, the through image obtained in the same pixel density and area as the through image acquired in the case of the same magnification may be electronically magnified five-fold.

As the sufficient number of pixels which do not deteriorate image quality, when the through image acquired by same magnification is magnified five-fold, the display magnification needs to be pixel same magnification or less. More specifically, with respect to the through image acquired by same magnification, the number of pixels contained in the display area in the case of magnifying the image five-fold needs to be the number of pixels or more of the display member 118. The magnification area guide 601 represents that the image is presently magnified five-fold (displays "×5"), and indicates where the imaging area magnified five-fold (magnification area) is presently displayed. Other information displays are the same as in the case of same magnification.

FIG. 6B is a display example in the case of five-fold magnification of the display type 2. In the five-fold magnification of the display type 2, the magnification area guide 601 and the information in the display type 2 are displayed together with the through image for five-fold.

Figure 6C:
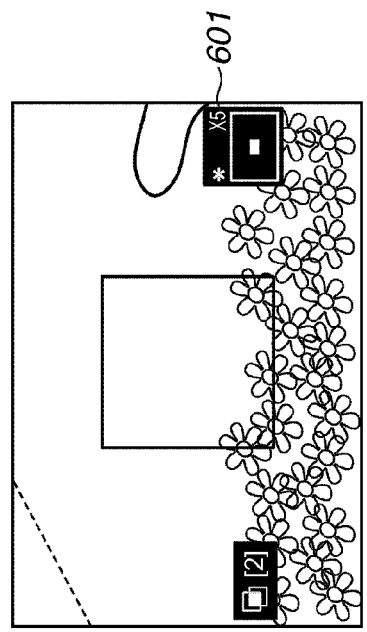

FIG. 6C is a display example in the case of five-fold magnification of the display type 3 and the multiple live view display. The example displays an image obtained by multiple-synthesizing the through image for five-fold and the image data obtained by magnifying five-fold the corresponding area of the synthesis image data in the video signal processing circuit 116. Simultaneously, the example displays the magnification area guide 601 and the information in the display type 3.

FIG. 6D is a display example in the case of five-fold magnification of the display type 3 which does not perform the multiple live view display. The example displays only the through image for five-fold as the image. Simultaneously, the example displays the magnification area guide 601 and the information in the display type 3.

As illustrated in FIG. 6C, even if a magnification display is performed while multiple live view is performed, the through image overlaps with the synthesis image data. Thereby, the status of the focus cannot be clearly viewed, and the focus is inconveniently adjusted. Accordingly, while the detail of control will be described later in the first exemplary embodiment, the multiple live view display is released also in the case of the magnification when the multiple live view display is performed in the same magnification of the display type 3. Thereby, as illustrated in FIG. 6D, only the through image is displayed, and the status of the focus is easily viewed.

<Multiple Exposure Photography Mode Processing 1>

Figure 7:
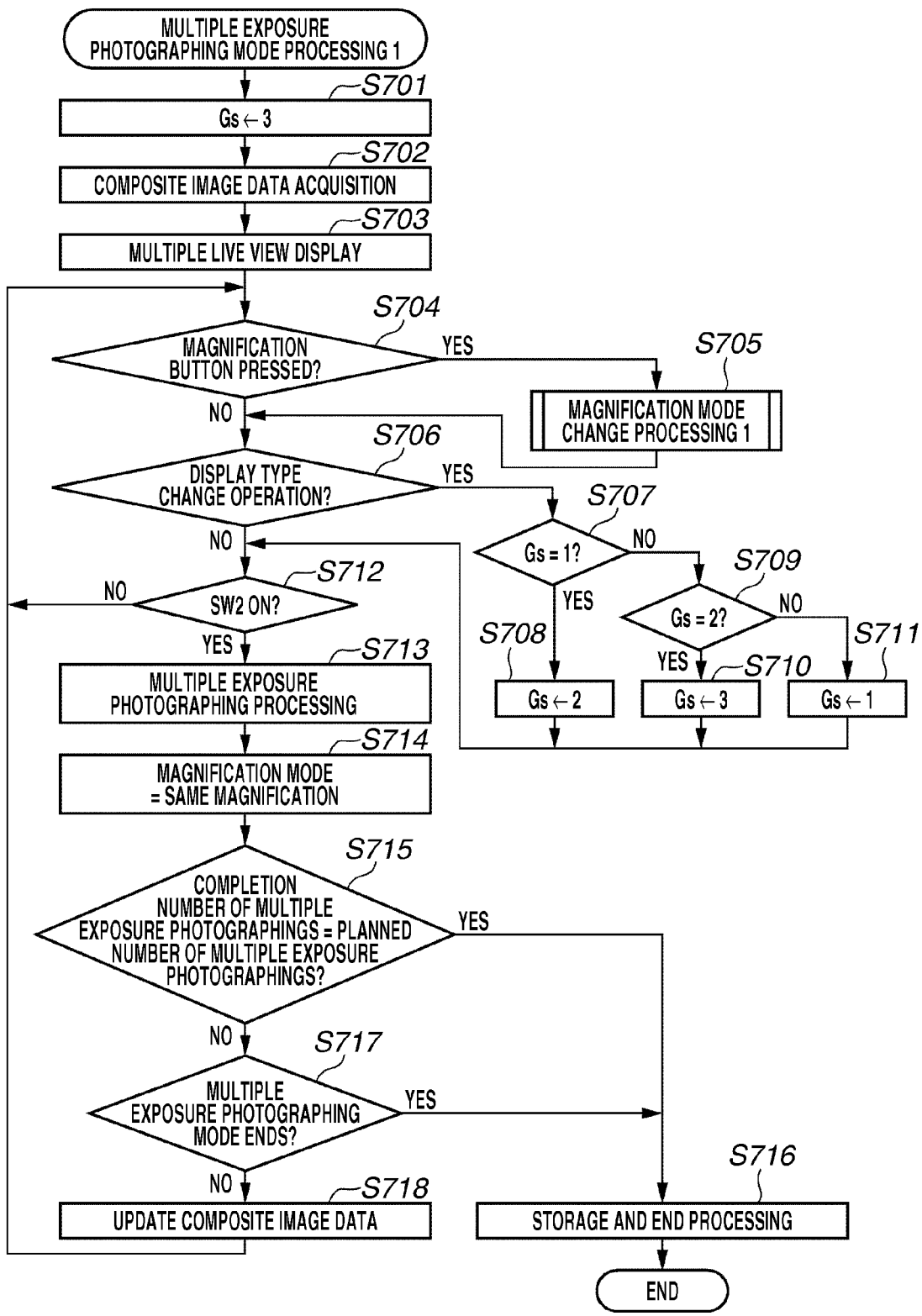
FIG. 7 is a flow chart of processing 1 for multiple exposure photography mode.

FIG. 7 is a flow chart of multiple exposure photography mode processing 1. A program recorded in the nonvolatile memory 130 is developed in the system memory 132, and the microcomputer 123 executes the program to realize the processing of FIG. 7. In the case of the processing of FIG. 7, the through image is sequentially captured. When the digital camera 100 is started to perform the live view display in the photography mode, and the multiple exposure photography necessity is set to "execute" to operate in the multiple exposure photography mode, the processing of FIG. 7 is started.

In step S701, the microcomputer 123 initializes the display type Gs to 3 (a display type for a multiple live view display in same magnification).

In step S702, the microcomputer 123 acquires the synthesis image data to be multiple-synthesized on the through image. When the buffer memory 122 holds multiple-synthesized image data of the images (including the base image when the base image exists) obtained up to the present time in the multiple exposure photography mode, the microcomputer 123 acquires the data as the synthesis image data. When the buffer memory 122 does not hold the synthesized image data, if the buffer memory 122 holds a most recently captured image, the microcomputer 123 acquires the image as the synthesis image data. When the buffer memory 122 does not hold the most recently captured image, if the base image is set, the microcomputer 123 reads the base image from the recording medium 120, and acquires the base image as the synthesis image data. If the base image also is not set, the through image includes no image to be multiple-synthesized. Thereby, the microcomputer 123 does not acquire the synthesis image data.

In step S703, the microcomputer 123 performs display control to perform the multiple live view display. FIG. 5C described above is a display example in this case.

In step S704, the microcomputer 123 determines whether the magnification button 23 is depressed. When the microcomputer 123 determines that the magnification button 23 is depressed and the microcomputer 123 has received a magnification instruction, the processing proceeds to step S705. If not, the processing proceeds to step S706. In step S705, the microcomputer 123 performs magnification mode change processing 1 according to the received magnification instruction. The magnification mode change processing 1 will be described later using FIG. 9.

In step S706, the microcomputer 123 determines whether a display type change operation has been performed. Specifically, the microcomputer 123 determines whether the information display button 16 is depressed. When the microcomputer 123 determines that the information display button 16 is depressed, the processing proceeds to step S707. If not, the processing proceeds to step S712.

In step S717, the microcomputer 123 determines whether the presently set display type Gs is 1. When the microcomputer 123 determines that the display type Gs is 1, the processing proceeds to step S708. If not, the processing proceeds to step S709. In step S708, the microcomputer 123 sets the display type Gs to 2, and starts a display in the display type 2. Therefore, when the magnification mode is set to same magnification, the microcomputer 123 performs the display of FIG. 5B described above. When the magnification mode is set to five-fold, the microcomputer 123 performs the display of FIG. 6B described above.

In step S709, the microcomputer 123 determines whether the presently set display type Gs is 2. When the microcomputer 123 determines that the display type Gs is 2, the processing proceeds to step S710. If not (that is, Gs=3), the processing proceeds to step S711.

In step S710, the microcomputer 123 sets the display type Gs to 3, and starts a display in the display type 3. Thereby, when the magnification mode is set to same magnification, as illustrated in FIG. 5C described above, the microcomputer 123 performs the multiple live view display. When the magnification mode is set to five-fold, the microcomputer 123 displays only the through image as described in FIG. 6D.

In step S711, the microcomputer 123 sets the display type Gs to 1, and starts a display in the display type 1. Therefore, when the magnification mode is set to same magnification, the microcomputer 123 performs the display of FIG. 5A described above. When the magnification mode is set to five-fold, the microcomputer 123 performs the display of FIG. 6A described above.

In step S712, the microcomputer 123 determines whether the SW2 is turned ON (that is, whether the actual photography is instructed by the full-depression of the release button 10). When the microcomputer 123 determines that the SW2 is set to ON, the processing proceeds to step S713. If not, the processing returns to step S704, and the microcomputer 123 repeats the processing.

In step S713, the microcomputer 123 performs control to perform multiple exposure photography processing. The microcomputer 123 first controls exposure in the multiple exposure photography processing. When the microcomputer 123 completes the exposure, the microcomputer 123 reads the image signal accumulated in the imaging element 112, and gives instructions to the video signal processing circuit 116 to generate the development data from the read image signal. The buffer memory 122 stores the generated development data. Then, the microcomputer 123 makes the video signal processing circuit 116 compress the development data stored in the buffer memory 122, and records the compressed development data in the recording medium 120 as the image file. The image file is not synthesized, but is an original single image.

Then, the microcomputer 123 records information representing the storage area of the image file recorded this time, in the written file information held in the system memory 132. The microcomputer 123 adds 1 to the completion number of the multiple exposure photography held in system memory 132. Then, the microcomputer 123 generates synthesized image data obtained by multiple-synthesizing the image captured this time, the images already captured up to the present time in the multiple exposure photography mode, and the base image if the base image is set. The microcomputer 123 stores the synthesized image data in the buffer memory 122.

In step S714, the microcomputer 123 changes the magnification mode flag held in the system memory 132 to same magnification. Thereby, the magnification is released when the multiple exposure photography processing is performed.

In step S715, the microcomputer 123 determines whether the completion number of the multiple exposure photography held in the system memory 132 becomes equal to the scheduled number of the multiple exposure photography. When the completion number of the multiple exposure photography becomes equal to the scheduled number of the multiple exposure photography, the multiple exposure photography has been performed until the number of the multiple exposure photography has reached the target number and the processing proceeds to step S716. Then, the microcomputer 123 performs storage and end processing. When the completion number of the multiple exposure photography does not become equal to the scheduled number of the multiple exposure photography, the processing proceeds to step S717.

In step S716, the microcomputer 123 performs the storage and the end processing. In the storage and the end processing, the microcomputer 123 ends the multiple exposure photography at this time point, generates the multiple-composite image using the images acquired until this time, and records the multiple-composite image in the recording medium 120 as the image file. The microcomputer 123 performs initialization processing of the multiple exposure photography. The microcomputer 123 deletes all the image data recorded in the buffer memory 122 in the initialization processing. The microcomputer 123 resets the scheduled number of the multiple exposure photography and the completion number of the multiple exposure photography recorded in the system memory 132. The microcomputer 123 changes the multiple exposure photography necessity setting to "not execute". The microcomputer 123 sets the flag of the multiple exposure photography in progress to 0, which is held in the system memory 132. The microcomputer 123 erases all the contents of the written file information held in the system memory 132.

In step S717, the microcomputer 123 determines whether a half way ending event has occurred. The half way ending event is an event for ending the multiple exposure photography mode in a midstream. Examples of the half way ending event include the followings:

An event for setting the multiple exposure photography necessity to "not execute" according to the user's operation;

An event for turning off a power supply such as an operation of the main Sw 20 by the user, opening of the card lid 28, opening of the battery lid 29, or a lapse of an auto-power-off time.

An event for bringing the apparatus into a state where the multiple exposure photography cannot be continued according to a photography setting condition.

When the half way ending event exists, the processing proceeds to step S716. If not, the processing proceeds to step S718.

In step S718, the microcomputer 123 updates the synthesis image data. Herein, the microcomputer 123 performs the processing of S702 again to update the synthesis image data to be the latest data reflecting the multiple exposure photography processing in step S713. After the microcomputer 123 ends the processing of step S718, the processing returns to step S704, and the microcomputer 123 repeats the processing.

<Magnification Mode Change Processing 1>

Figure 8:
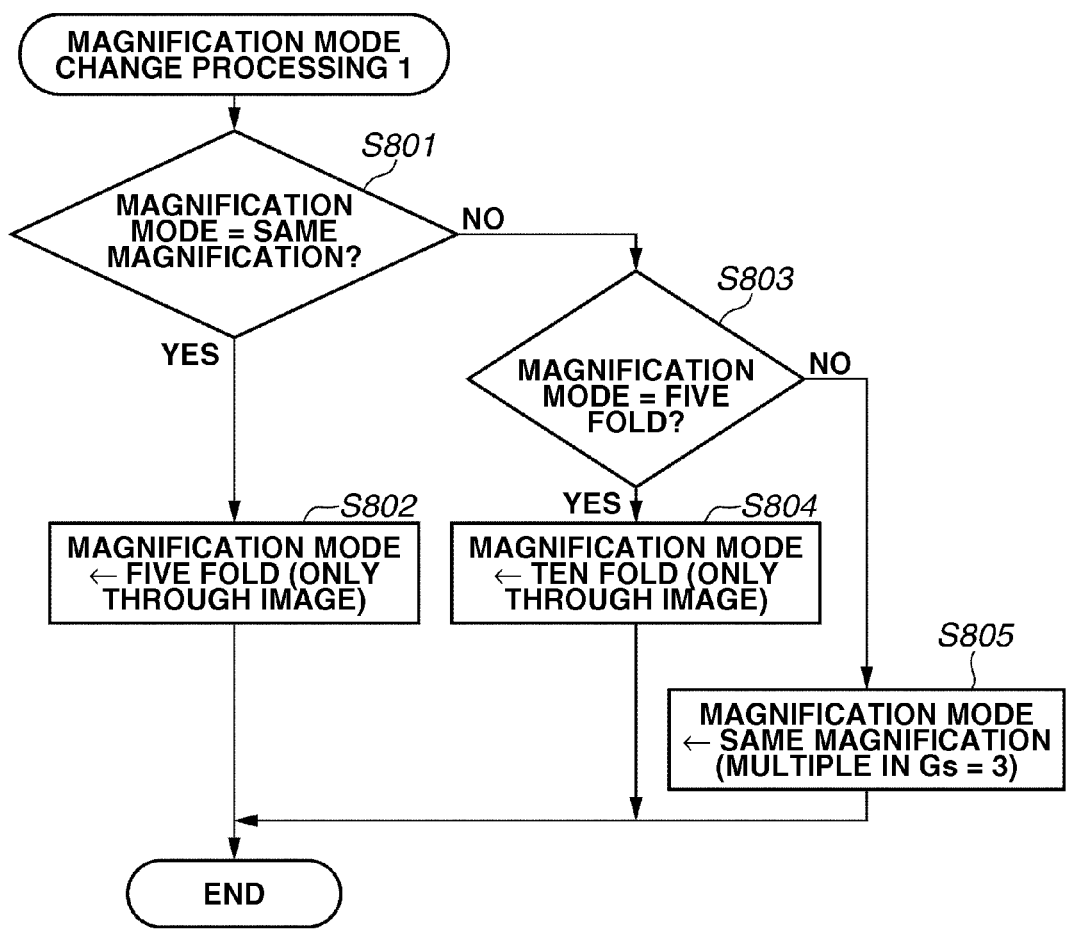
FIG. 8 is a flow chart of processing 1 for magnification mode change.

FIG. 8 illustrates a flow chart of the magnification mode change processing 1 described above in step S705 of FIG. 7. A program recorded in the nonvolatile memory 130 is developed in the system memory 132, and the microcomputer 123 executes the program. Thereby, the processing of FIG. 7 is realized.

In step S801, the microcomputer 123 determines whether the present magnification mode is set to same magnification with reference to the magnification mode flag held in the system memory 132. When the microcomputer 123 determines that the magnification mode is set to same magnification, the processing proceeds to step S802. If not, the processing proceeds to step S803.

In step S802, the microcomputer 123 changes the magnification mode flag, and starts the live view display (display magnified five-fold) in magnification mode=five-fold. Herein, the multiple display of the synthesis image data and the through image is not performed in the live view display in magnification mode=five-fold, and only the through image for five-fold is displayed as the image. However, the information according to the display type Gs other than the image may be displayed. When a same magnification display is performed in the display type Gs=3 through the processing of step S802 before the magnification button 23 is depressed, the multiple display state is changed to a multiple non-display state according to the depression of the magnification button 23. Anyone display of FIGS. 6A, 6B, and 6C described above is performed according to the set display type when magnification mode=five-fold.

In step S803, the microcomputer 123 determines whether the present magnification mode is set to five-fold with reference to the magnification mode flag held in the system memory 132. When the microcomputer 123 determines that the magnification mode is set to five-fold, the processing proceeds to step S804. If not, in other words, if the magnification mode is set to ten-fold, the processing proceeds to step S805.

In step S804, the microcomputer 123 changes the magnification mode flag, and starts the live view display (display magnified ten-fold) in magnification mode=ten-fold. The through image for ten-fold is used in the live view display in ten-fold. The through image for ten-fold is a through image captured in a pixel density and in an area different from the same magnification, by the imaging element 112 so that resolution of an area magnified and displayed ten-fold is sufficiently great, similar to the through image for five-fold.

In step S805, the microcomputer 123 changes the magnification mode flag, and starts the live view display in magnification mode=same magnification (that is, releases the magnification). At this time, in the case of display type Gs=3, the multiple live view display is restarted. Any one display of FIGS. 5A, 5B, and 5C described above is performed according to the set display type in the magnification mode=same magnification.

Thus, when the multiple live view display of the through image and the captured synthesis image data is performed in the multiple exposure photography mode according to the exemplary embodiment 1, the multiple composite is released if the magnification operation is carried out to display the through image. Therefore, when the image is magnified during the live view display to confirm the degree of the adjustment of the focus, the multiple captured image does not hinder the visual recognition. Accordingly, the user can more correctly confirm the degree of the adjustment of the focus A second exemplary embodiment describes an example in which whether a multiple display is performed is switched depending on whether a focus adjustment mode is AF or MF, and whether it is necessary to confirm a focus, in addition to whether to perform magnification during a live view display in a multiple exposure photography mode.

A configuration block diagram of a digital camera 100 according to the second exemplary embodiment, an outline view thereof, preliminary setting of multiple exposure photography, and data used for processing are the same as those of the first exemplary embodiment.

<Multiple Exposure Photography Mode Processing 2>

Figure 9B:
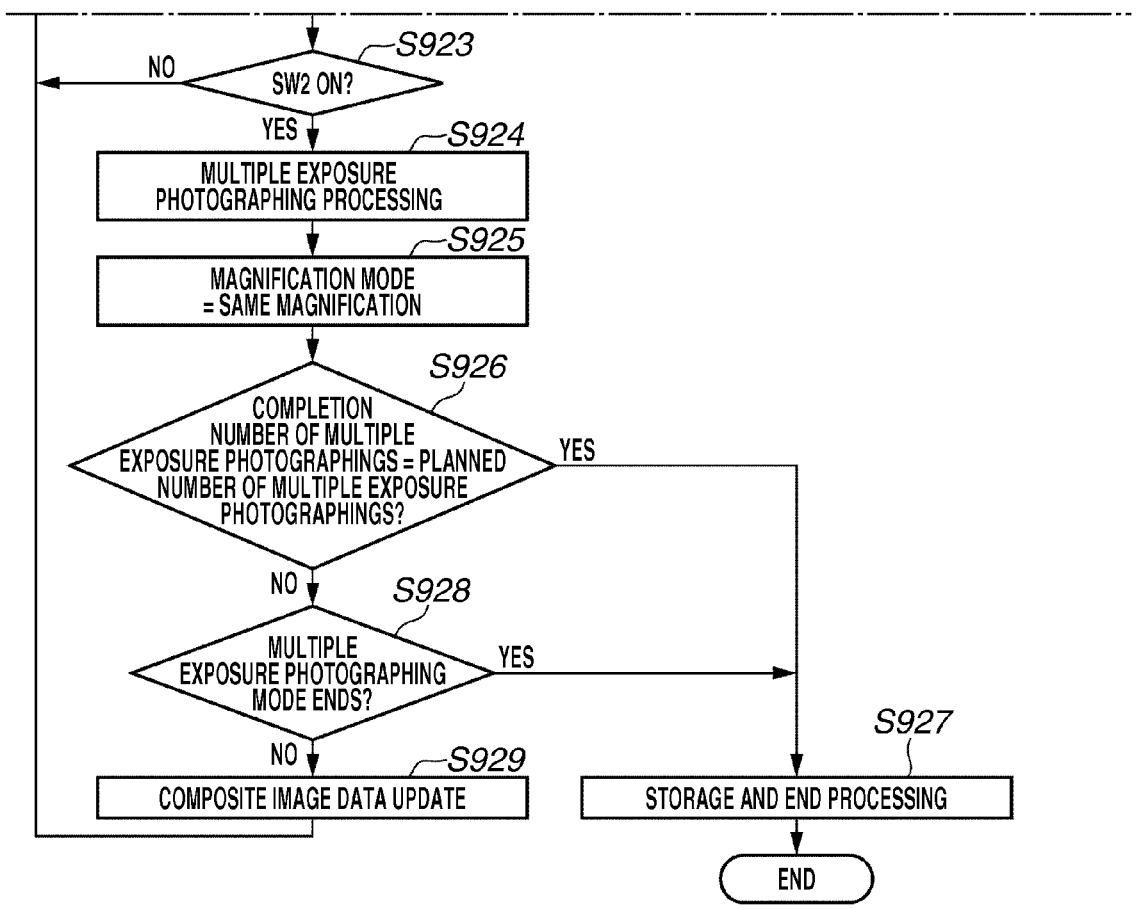
FIG. 9 (FIGS. 9A and 9B) are a flow chart of processing 2 for multiple exposure photography mode.

FIG. 9 illustrates a flow chart of multiple exposure photography mode processing 2 in the second exemplary embodiment. A program recorded in a nonvolatile memory 130 is developed in a system memory 132, and a microcomputer 123 executes the program. Thereby, the processing of FIG. 9 is realized. In the case of the processing of FIG. 9, a through image is sequentially captured. When the digital camera 100 is started to perform the live view display in the photography mode, and multiple exposure photography necessity is set to "execute", the processing of FIG. 9 is started.

Because processing in step S901 to step S904 is the same as step S701 to step S704 of FIG. 7 described above, the descriptions thereof will be omitted.

In step S905, the microcomputer 123 performs magnification mode change processing 2. The magnification mode change processing 2 will be described later using FIG. 10.

Because processing of step S907 to step S911 are the same as the processing in step S707 to step S711 of FIG. 7 described above, the descriptions thereof will be omitted. However, if a timer to be described later is counting when the display is changed to display type Gs=3 in step S910 during the magnification, only the through image is displayed. If the timer is not counting, a multiple live view display is performed. As described above, only the through image in the display type 3 is displayed five-fold as illustrated in FIG. 6D. The multiple live view display in the display type 3 is performed in five-fold as illustrated in FIG. 6C.

In step S912, the microcomputer 123 determines whether the present display type Gs is 3. When Gs=3, the multiple live view display is performed if a timer described later is cleared or time is up (in other words, if the timer is not counting). In the case of Gs=3, the processing proceeds to step S913. If not, the processing proceeds to step S923.

In step S913, the microcomputer 123 determines whether the present focus adjustment mode is an autofocus mode (AF mode) or a manual focus mode (MF mode). When the microcomputer 123 determines that the focus adjustment mode is the AF mode, the processing proceeds to step S914. When the microcomputer 123 determines that the focus adjustment mode is the MF mode, the processing proceeds to step S918. The focus adjustment mode setting for setting the focus adjustment mode to the AF mode or the MF mode is preliminarily set from a menu screen displayed by pressing a menu button 17, or set using an AF/MF switching button (not illustrated) provided in a photography lens 101.

In step S914, the microcomputer 123 acquires the present AF evaluation value (regardless whether the AF evaluation value is contrast AF or phase difference AF). Then, in step S915, the microcomputer 123 determines whether the AF evaluation value acquired in step S913 has changed by a threshold value or more as compared with the previously acquired AF evaluation value. When the AF evaluation value has changed, the processing proceeds to step S916. The microcomputer 123 releases the multiple live view display, and displays only the through image as the image. When the AF evaluation value has changed, the status of the focus is changed from the status recognized previously by a user. Therefore, the microcomputer 123 changes the display to only the through image so that the user can correctly confirm the status of the focus again. In step S917, the microcomputer 123 stops the multiple live view display, clears (initializes) the timer for measuring a predetermined time (about several seconds) as a period for displaying only the through image, and starts the count.

In step S918, the microcomputer 123 determines whether a manual focus operation for manually adjusting a focus has been performed. The operation for adjusting the focus is an operation on a focus ring (not illustrated) in the photography lens 101. The operation may be an operation on other operation members. When the microcomputer 123 determines that it has received the operation for adjusting the focus (focus operation reception), the processing proceeds to step S919. If not, the processing proceeds to step S920. In step S919, the microcomputer 123 drives a focus lens according to a focus adjustment operation. Then, the processing proceeds to step S916. The microcomputer 123 stops the multiple live view display, and displays only the through image as the image. Herein, the microcomputer 123 displays only the through image in order to make the user correctly confirm the status of the focus, which enables the correct adjustment of the focus when the user performs the adjustment operation of the focus.

In step S920, the microcomputer 123 determines whether a time after stopping the multiple live view display in step S917, or a time after stopping the multiple live view display in the processing of FIG. 10 as described later has reached a predetermined time, and whether the timer is up. When the microcomputer 123 determines that the timer is up, the processing proceeds to step S921. When the microcomputer 123 determines that the timer is not up, the processing proceeds to step S923. In step S923, the microcomputer 123 changes the live view display in the display type Gs=3 in which the display was changed to the through image only, to the multiple live view display. More specifically, after the microcomputer 123 releases the multiple live view display and the predetermined time to be measured by the timer has elapsed, the microcomputer 123 restarts the multiple live view display. When the microcomputer 123 restarts the multiple live view display, the microcomputer 123 clears the timer which has been measuring a time until the microcomputer 123 restarts the multiple live view display in step S922.

Because processing in step S923 to step S929 are the same as the processing in step S712 to step S718 described above, the descriptions thereof will be omitted.

<Magnification Mode Change Processing 2>

Figure 10:
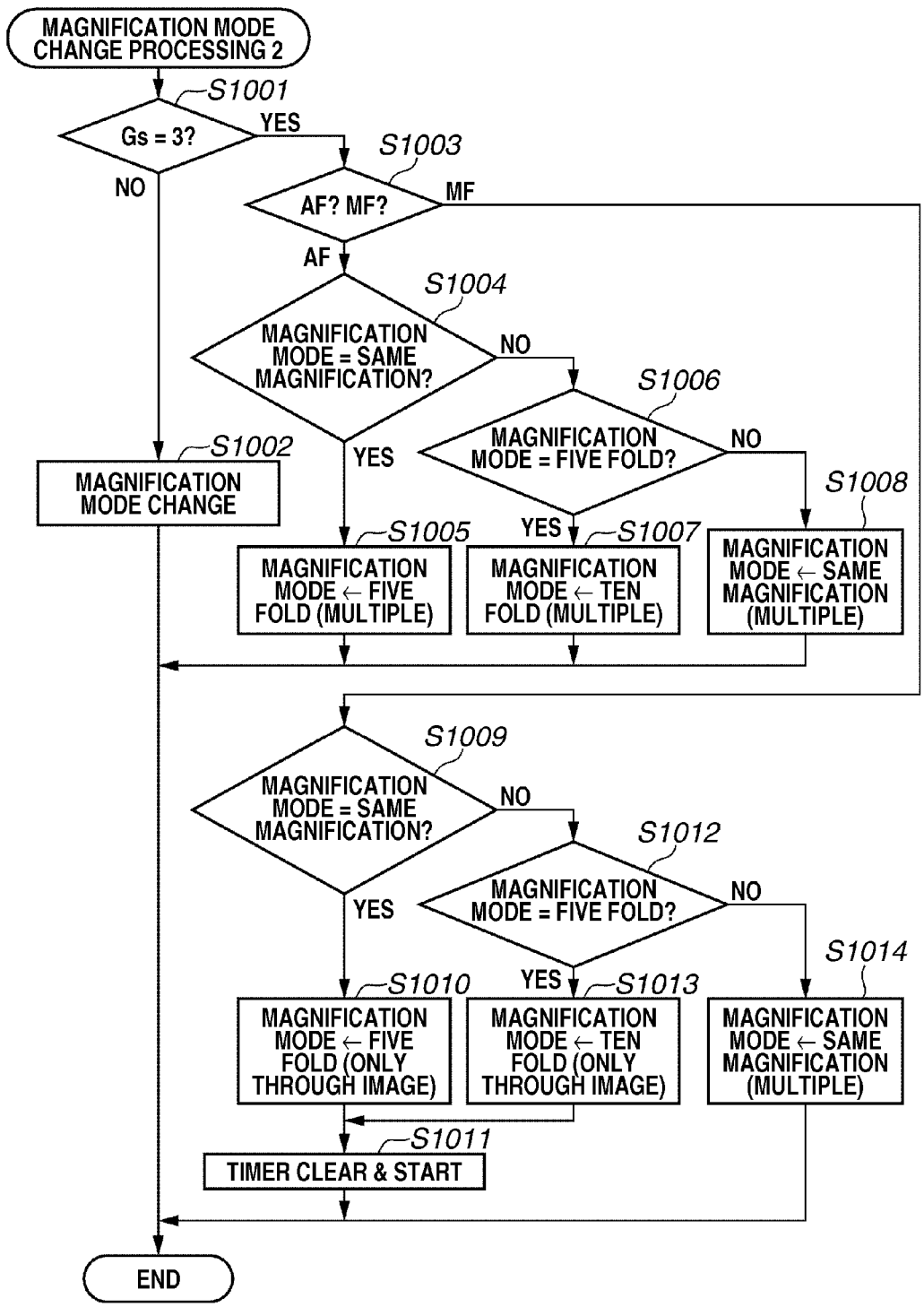
FIG. 10 is a flow chart of processing 2 for magnification mode change.

FIG. 10 illustrates a flowchart of the magnification mode change processing 2 described above in step S905 of FIG. 9. A program recorded in the nonvolatile memory 130 is developed in the system memory 132, and the microcomputer 123 executes the program. Thereby, the processing of FIG. 10 is realized.

In step S1001, the microcomputer 123 determines whether the present display type Gs is 3. When the microcomputer 123 determines that display type Gs is 3, the processing proceeds to step S1003. If not, the processing proceeds to step S1002.

In step S1002, upon depressing of the magnification button 23, the microcomputer 123 changes the magnification mode to five-fold if the live view display was set to same magnification before the pressing of a magnification button 23. The microcomputer 123 changes the magnification mode to ten-fold if the live view display was set to five-fold before the pressing. The microcomputer 123 changes the magnification mode to same magnification if the live view display was set to ten-fold before the pressing.

In step S1003, the microcomputer 123 determines whether the present focus adjustment mode is the AF mode or the MF mode. When the microcomputer 123 determines that the focus adjustment mode is the AF mode, the processing proceeds to step S1004. When the microcomputer 123 determines that the focus adjustment mode is the MF mode, the processing proceeds to step S1009.

In step S1004, the microcomputer 123 determines whether the present magnification mode is set to same magnification with reference to a magnification mode flag held in the system memory 132. When the microcomputer 123 determines that the magnification mode is set to same magnification, the processing proceeds to step S1005. If not, the processing proceeds to step S1006.

In step S1005, the microcomputer 123 changes the magnification mode flag, and starts the live view display (display magnified five-fold) in magnification mode=five-fold. Herein, the multiple live view display is performed in the live view display in magnification mode=five-fold. This is because it can be assumed that the user may not view and confirm the status of the focus so much in the AF mode as in the MF mode, instead magnification is performed in order to correctly perform the position adjustment of a photographic subject to be synthesized. A display example at this time is illustrated in FIG. 6C described above.

In step S1006, the microcomputer 123 determines whether the present magnification mode is set to five-fold with reference to the magnification mode flag held in the system memory 132. When the microcomputer 123 determines that the magnification mode is set to five-fold, the processing proceeds to step S1007. If not, in other words, if the magnification mode is set to ten-fold, the processing proceeds to step S1008.

In step S1007, the microcomputer 123 changes the magnification mode flag, and starts the live view display (display magnified ten-fold) in magnification mode=ten-fold. Herein, the microcomputer 123 performs the multiple live view display in magnification mode=ten-fold, for the same reason as the live view display of five-fold in step S1005.

In step S1008, the microcomputer 123 changes the magnification mode flag, and starts the live view display in magnification mode=same magnification (that is, releases magnification). Because Gs is 3 in this case, the microcomputer 123 performs the multiple live view display. A display example at this time is illustrated in FIG. 5C described above.

On the other hand, when the focus adjustment mode is the MF mode, the microcomputer 123 determines whether the present magnification mode is set to same magnification with reference to the magnification mode flag held in the system memory 132 in step S1009. When the microcomputer 123 determines that the magnification mode is set to same magnification, the processing proceeds to step S1010. If not, the processing proceeds to step S1012.

In step S1010, the microcomputer 123 changes the magnification mode flag, and starts the live view display (display magnified five-fold) in magnification mode=five-fold. Herein, the microcomputer 123 displays only the through image for five-fold as the image while the multiple live view display is performed in magnification mode=five-fold. However, the microcomputer 123 may display the information according to the display type Gs other than the image. The microcomputer 123 releases the multiple live view display because it can be assumed that the MF mode is a mode in which the user performs focus adjustment while viewing the live view display by himself, and magnification is performed in order to more correctly confirm the status of the focus. The microcomputer 123 displays only the through image, and thereby the synthesis image data does not hinder visual recognition, and the status of the focus of the through image can be correctly confirmed. A display example at this time is illustrated in FIG. 6D described above.

In step S1011, the microcomputer 123 stops the multiple live view display, clears (initializes) the timer for measuring a predetermined time (about several seconds) as a period for displaying only the through image, and starts the count.

In step S1012, the microcomputer 123 determines whether the present magnification mode is set to five-fold with reference to the magnification mode flag held in the system memory 132. When the microcomputer 123 determines that the magnification mode is set to five-fold, the processing proceeds to step S1013. If not, in other words, in the case of ten-fold, the processing proceeds to step S1014.

In step S804, the microcomputer 123 changes the magnification mode flag, and starts the live view display (display magnified ten-fold) in magnification mode=ten-fold. The microcomputer 123 displays only the through image for ten-fold as the image while the multiple live view display is not performed even in the live view display of ten-fold in step S1013 for the same reason as the live view display of five-fold in step S1010.

In step S1014, the microcomputer 123 changes the magnification mode flag, and starts the live view display in magnification mode=same magnification (that is, releases magnification). At this time, because the display type Gs is 3, the microcomputer 123 restarts the multiple live view display. A display example at this time is illustrated in FIG. 5C described above.

As described above, when the microcomputer 123 performs magnification during the live view display in the multiple exposure photography mode in the second exemplary embodiment, and the focus adjustment mode is the AF mode, the microcomputer 123 does not release the multiple live view display. When the focus adjustment mode is the MF mode, the microcomputer 123 releases the multiple live view, and magnifies and displays only the through image. Thereby, in the case of the AF mode, user can view the magnified multiple live view display, and confirm the synthetic position of the photographic subject. In the case of the MF mode, the user can view the magnified through image, and perform the focus adjustment while correctly confirming the status of the focus.

When the AF evaluation value is changed in the case where the multiple live view display is performed in the multiple exposure photography mode, the microcomputer 123 stops the multiple live view display, and displays only the through image. Thereby, the user can view the through image to correctly confirm how the status of the focus is changed in case of the focus status change. The example has been described in a case where the AF evaluation value is changed. However, if other evaluation value for imaging influences the status of the focus, the similar control is suitably performed.

When the focus adjustment operation in MF is performed in the case where the multiple live view display is being performed in the multiple exposure photography mode, the microcomputer 123 stops the multiple live view display, and displays only the through image. Thereby, because the user can view the through image to correctly confirm the status of the focus, the user can more correctly adjust the focus.

Furthermore, when a predetermined time has elapsed after user stops the multiple live view display, and displays only the through image, the multiple live view display is automatically restarted. Therefore, when the user confirms the synthetic position of the photographic subject after confirming the status of the focus, the user can omit time and effort for performing an operation for restarting the multiple live view display.

In a third exemplary embodiment, when a user releases a multiple live view display through a magnification operation, and magnifies and displays only a through image, in view of mismatching caused in a display type 3 (multiple live view display), a display type is automatically changed together with magnification.

A configuration block diagram of a digital camera 100 according to the third exemplary embodiment, an outline view thereof, preliminary setting of multiple exposure photography, and data used for processing are the same as the first exemplary embodiment. Because multiple exposure photography mode processing is also the same as the processing of FIG. 7 described in the first exemplary embodiment except for step S705, the descriptions thereof will be omitted. However, in the third exemplary embodiment, magnification mode change processing 3 to be described below is performed in place of the magnification mode change processing 1 of step S705 of FIG. 7.

<Magnification Mode Change Processing 3>

Figure 11:
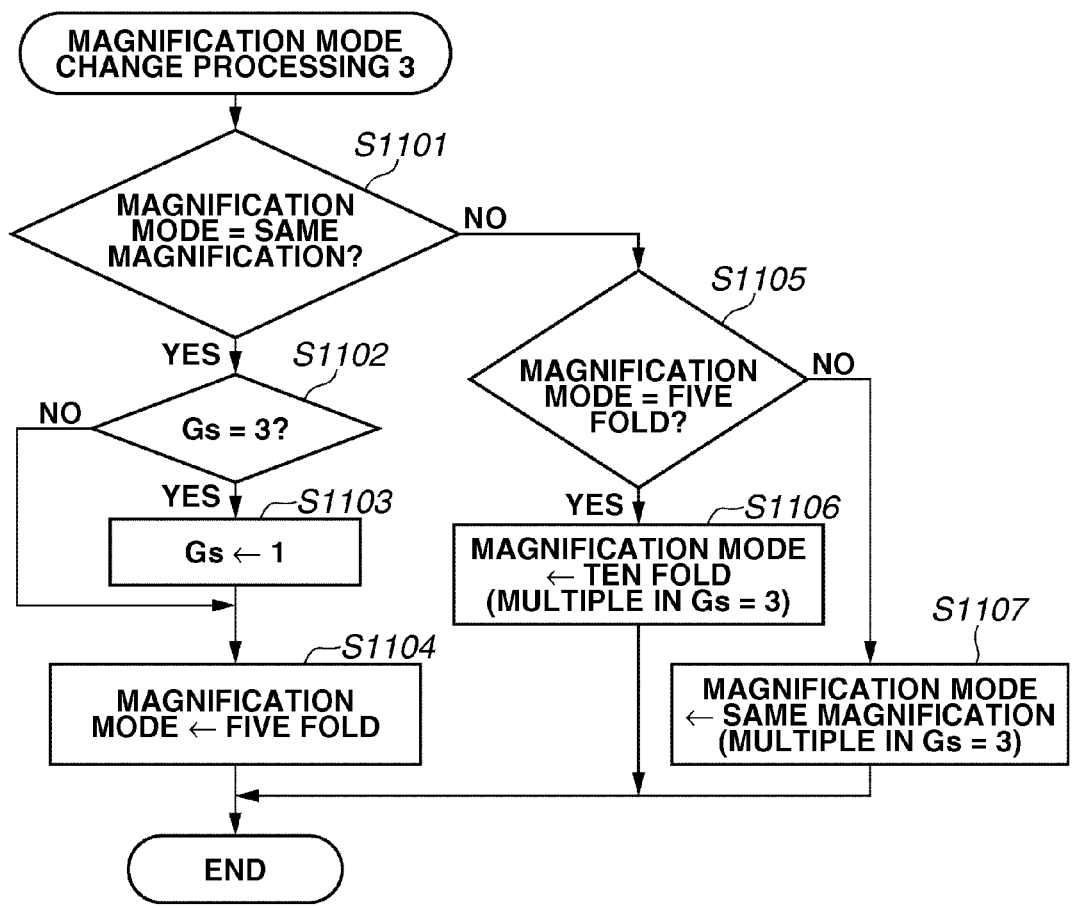
FIG. 11 is a flow chart of processing 3 for magnification mode change.

FIG. 11 illustrates a flow chart of the magnification mode change processing 3 as another example of step S705 of FIG. 7. A program recorded in the nonvolatile memory 130 is developed in the system memory 132, and the microcomputer 123 executes the program. Thereby, the processing of FIG. 11 is realized.

In step S1101, the microcomputer 123 determines whether the present magnification mode is set to same magnification with reference to the magnification mode flag held in the system memory 132. When the microcomputer 123 determines that the magnification mode is set to same magnification, the processing proceeds to step S1102. If not, the processing proceeds to step S1105.

In step S1102, the microcomputer 123 determines whether the present display type Gs is 3. When the microcomputer 123 determines that display type Gs is 3, the processing proceeds to step S1103. If not, the processing proceeds to step S1104.

In step S1103, the microcomputer 123 changes the display type Gs to 1. Thereby, because in this display type, the multiple live view display is not performed, only the through image is magnified and displayed when magnification is performed as described below. An information display is not used for a multiple live view display but suitable only for displaying the through image. This can prevent the mismatching in which only the through image is displayed without performing the multiple live view display in spite of the display type for the multiple live view display.

In step S1104, the microcomputer 123 changes the magnification mode flag, and starts the live view display (display magnified five-fold) in magnification mode=five-fold. Herein, because the display type is other than 3, the microcomputer 123 does not perform the multiple live view display, and magnifies and displays only the through image (displays the information display). When the user thereafter operates an information display button 16 to make a setting to the display type 3, the microcomputer 123 can perform the multiple live view display even in the magnification mode of five-fold.

Because processing of S1105 to step S1107 are the same as step S803 to S805 of FIG. 8 described above, the descriptions thereof will be omitted.

The magnification mode change processing 3 of FIG. 11 may be applied in place of the magnification mode change processing 2 of step S905 of FIG. 9 described in the second exemplary embodiment. As described in the second exemplary embodiment, the microcomputer 123 may perform the magnification mode change processing 3 only in the case of the MF mode, according to whether the focus adjustment mode is the AF mode or the MF mode.

When the operation for confirming the status of the focus is performed even if the multiple live view display is performed in the multiple exposure photography according to the exemplary embodiments described above, or when the status of the focus is preferably confirmed, the microcomputer 123 automatically releases the multiple live view display. Because the microcomputer 123 displays only the through image, the user can easily view the through image, and can correctly confirm the status of the focus.

Although the examples performing multiple synthesis have been described using the development data in the above-mentioned exemplary embodiments, the multiple synthesis may be performed using undeveloped RAW image data. Although the example performing magnification has been described using the magnification button 23, the magnification (electronic zoom) may always be performed in the multiple live view display according to an operation on an operation member different from the magnification button 23. Thus, a suitable magnification method can be properly used according to the user's purpose depending on whether it is desired to confirm the status of the focus by way of the magnification or to confirm the synthetic position of the photographic subject in detail by way of the magnification.

Single hardware may control the microcomputer 123. Alternatively, plural pieces of hardware may share the processing, thereby controlling the entire apparatus.

Furthermore, the present invention has been described in detail based on the adequate exemplary embodiments. However, the present invention is not limited to these specific exemplary embodiments. The present invention includes various exemplary embodiments which do not depart from the spirit of the present invention. The above-mentioned embodiments merely represent one exemplary embodiment of the present invention. The exemplary embodiments can be suitably combined.

The above-mentioned exemplary embodiments have been applied to the digital camera as an example. However, the present invention is not limited to this example. As long as the imaging apparatus has the imaging unit, the present invention can be applied. In other words, the present invention can be applied to a digital camera, a digital camcorder, a personal computer and PDA with a camera, a mobile telephone terminal with a camera, a music player with a camera, a game machine with a camera, and an electronic book reader with a camera.

Other Embodiments

The present invention is realized also by executing the following processing. More specifically, the software (programs) realizing the functions of the above-mentioned exemplary embodiments are supplied to a system or an apparatus via a network or various storage media. The computer (or CPU and MPU) of the system or the apparatus reads and executes a program code. In this case, the present invention includes the programs and the storage media storing the programs.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
an imaging unit;
a magnification operation unit operated by a user to instruct an image magnification;
a display control unit configured to perform control to display a live image captured by the imaging unit on a display unit, and to perform control to display the live image with a magnification ratio changed in response to an operation of the magnification operation unit; and
a generation unit configured to generate a composite image by compositing the live image and at least one captured image,
wherein the display control unit performs control to display the composite image generated by the generation unit on the display unit, and performs control, in a case where the magnification operation unit is operated when the composite image is displayed, so as to display the live image without displaying the composite image.

2. The imaging apparatus according to claim 1, wherein the magnification operation unit comprises a magnification button.

3. The imaging apparatus according to claim 1, further comprising a setting unit configured to set the imaging apparatus to a multiple photography mode,
wherein the display control unit performs control, in a case where the imaging apparatus is set to the multiple photography mode, so as to display the composite image generated by the generation unit on the display unit while sequentially updating the composite image, and
wherein the display control unit performs control, in a case where the imaging apparatus is set to the multiple photography mode and in response to an operation of the magnification operation unit, so as to display the live image without displaying the composite image.

4. The imaging apparatus according to claim 3, further comprising a display switching operation unit, wherein the display control unit performs control to switch, according to an operation of the display switching operation unit, information to be displayed with the live image, and
wherein, in the multiple photography mode, the display of the composite image and the display of the live image can be switched according to an operation of the display switching operation unit.

5. The imaging apparatus according to claim 4, wherein, in a case where, in the multiple photography mode, a magnification ratio is changed according to an operation of the magnification operation unit, and a partially magnified live image is displayed, the display of the live image can be switched to the display of the composite image by an operation of the display switching operation unit while maintaining the magnification ratio.

6. The imaging apparatus according to claim 1, wherein the display control unit is capable of changing the magnification ratio of the live image to a plurality of magnification ratios and changes a magnification ratio to a different magnification ratio according to an operation of the magnification operation unit.

7. The imaging apparatus according to claim 1, wherein the display control unit is capable of changing the magnification ratio of the live image to a predetermined magnification for displaying the entire live image in an image display area.

8. The imaging apparatus according to claim 7, wherein the display control unit is capable of changing the magnification ratio to the predetermined magnification and a plurality of magnification ratios different from the predetermined magnification.

9. A method for controlling an imaging apparatus comprising an imaging unit and a magnification operation unit operated by a user to instruct an image magnification, the method comprising:
performing control to display a live image captured by the imaging unit on a display unit, and to display the live image with a magnification ratio of the live image changed in response to an operation of the magnification operation unit; and
generating a composite image by composing the live image and at least one captured image,
wherein, in the performing of control, control is performed such that, in response to an operation of the magnification operation unit when the composite image generated in the generating is displayed on the display unit, the live image is displayed without displaying the composite image.

10. An imaging apparatus comprising:
an imaging unit;
a magnification operation unit operated by a user to instruct an image magnification;
a display control unit configured to perform control to display a live image captured by the imaging unit on a display unit, and to perform control to magnify a part of the live image displayed on the display unit in response to an operation of the magnification operation unit; and
a generation unit configured to generate a composite image by compositing another captured image with the live image,
wherein the display control unit changes a display mode from displaying the live image with compositing another captured image by the generation unit, in response to an operation of the magnification operation unit, to displaying the live image without compositing another captured image.

11. The imaging apparatus according to claim 10, wherein the magnification operation unit comprises a magnification button.

12. The imaging apparatus according to claim 10, further comprising a setting unit configured to set the imaging apparatus to a multiple photography mode,
  wherein the display control unit performs control, in a case where the imaging apparatus is set to the multiple photography mode, so as to display the composite image generated by the generation unit on the display unit while sequentially updating the composite image, and
  wherein the display control unit performs control, in a case where the imaging apparatus is set to the multiple photography mode and in response to an operation of the magnification operation unit, to display the live image without displaying the composite image.

13. The imaging apparatus according to claim 12, further comprising a display switching operation unit,
  wherein the display control unit performs control to switch, according to an operation of the display switching operation unit, information to be displayed with the live image, and
  wherein, in the multiple photography mode, the display of the composite image and the display of the live image can be switched according to an operation of the display switching operation unit.

14. The imaging apparatus according to claim 13, wherein, in a case where, in the multiple photography mode, a magnification ratio is changed according to an operation of the magnification operation unit, and a partially magnified live image is displayed, the display of the live image can be switched to the display of the composite image by an operation of the display switching operation unit while maintaining the magnification ratio.

15. The imaging apparatus according to claim 10, wherein the display control unit is capable of changing a magnification ratio of the live image according to an operation of the magnification operation unit.

16. The imaging apparatus according to claim 15, wherein the display control unit is capable of changing the magnification ratio of the live image to a predetermined magnification for displaying the entire live image in an image display area.

17. The imaging apparatus according to claim 16, wherein the display control unit is capable of changing the magnification ratio between the predetermined magnification and another magnification ratio.

18. A method for controlling an imaging apparatus comprising an imaging unit and a magnification operation unit operated by a user to instruct an image magnification, the method comprising:
  performing control to display a live image captured by the imaging unit on a display unit, and to perform control to magnify a part of the live image displayed on the display unit in response to an operation of the magnification operation unit;
  generating a composite image by compositing another captured image with the live image; and
  changing a display mode from displaying the live image with compositing another captured image by the generation unit, in response to an operation of the magnification operation unit, to displaying the live image without compositing another captured image.

* * * * *